Sept. 10, 1957    H. H. KOPPEL    2,806,193
SELF-BALANCING POTENTIOMETER SYSTEM
Filed July 12, 1954
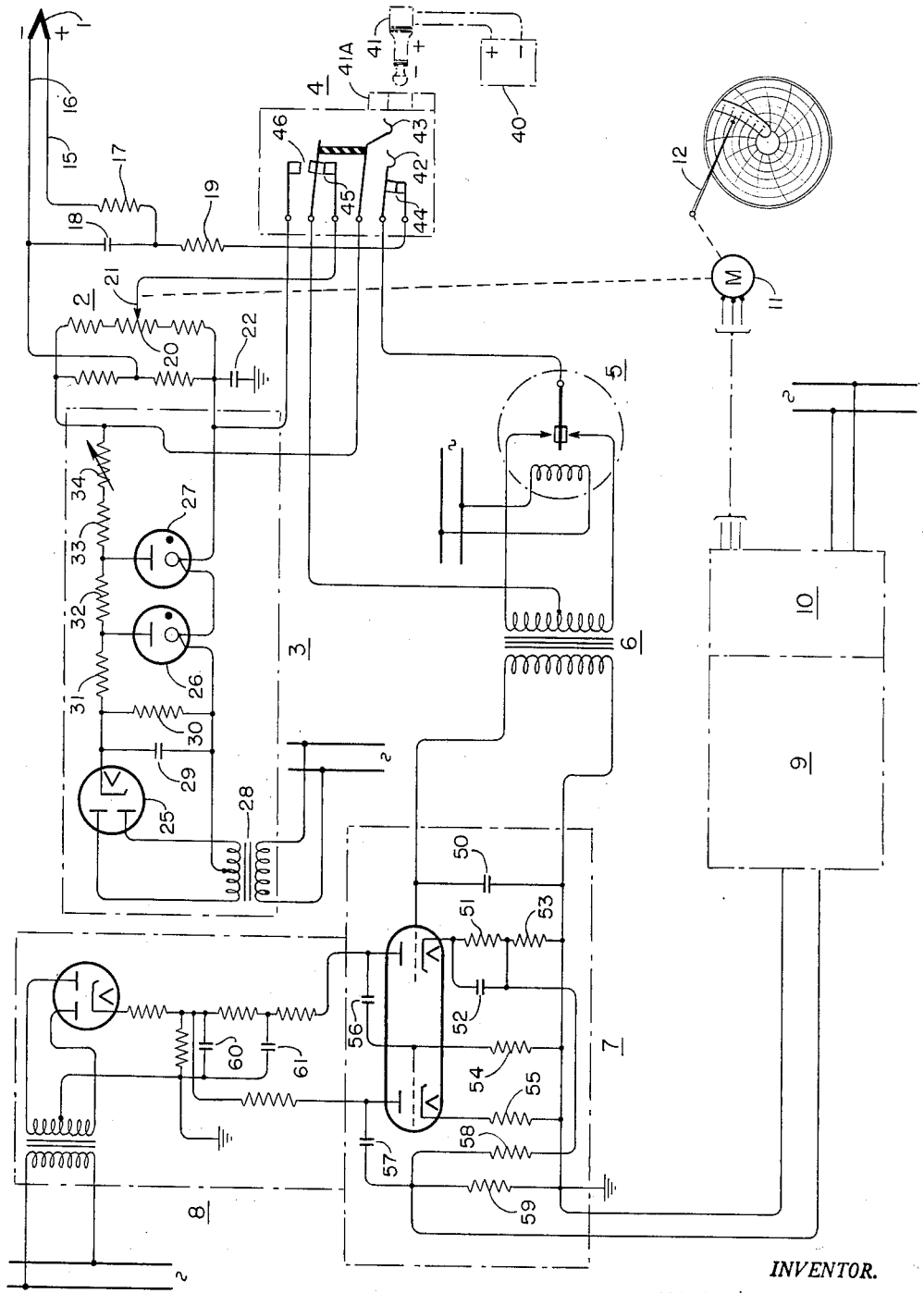
INVENTOR.
HAROLD H. KOPPEL
BY
Raymond W. Jenkins
ATTORNEY

United States Patent Office 2,806,193
Patented Sept. 10, 1957

2,806,193

SELF-BALANCING POTENTIOMETER SYSTEM

Harold H. Koppel, South Euclid, Ohio, assignor to Bailey Meter Company, a corporation of Delaware Application July 12, 1954, Serial No. 442,585

5 Claims. (Cl. 318—29)

This invention relates to systems for measuring unidirectional electromotive forces, or voltages, of small magnitude.

More specifically, this invention is directed to a self-balancing potentiometer measuring system wherein the output of the potentiometer, as an unbalance D.-C. voltage, is inverted into an A.-C. voltage of one phase or of opposite phase depending upon the sense of unbalance of the potentiometer circuit. Structure is provided for amplifying the A.-C. voltage and applying it to the drive circuit of an electric motor in order that the operation of the motor will rebalance the potentiometer circuit and simultaneously operate indicating, recording and/or control mechanisms. The system may be applied to the measurement of a specific condition and operate control mechanism which regulates that condition, or some other condition.

The primary object of the invention is to provide a new and novel measuring apparatus which accomplishes its functions in an improved manner. These improved results are accomplished by the coaction of new and novel structures, providing more accurate and faster measuring than heretofore experienced, together with an increased life for this type of apparatus.

More particularly, an object of this invention is to provide a new and improved input circuit for a self-balancing potentiometer network.

Another object of the invention is to provide a novel source of supply of a reference potential to the potentiometer network.

A further object of the invention is to provide new structure for amplifying the A.-C. voltage which is applied to the drive circuit of the electric motor which balances the potentiometer circuit and performs the recording function.

A further object of the invention is to provide a new arrangement for compensating for the phase shift introduced into the A.-C. voltage by the inverting function of a mechanical inverter.

A final object of the invention is to provide new structure for reducing the effect of extraneous voltages which tend to hamper the satisfactory operation of this type of apparatus.

The single drawing is a schematic illustration of the complete self-balancing potentiometer measuring system.

The description is initially directed to the device associated with a condition and producing a unidirectional electromotive force in accordance with the magnitude of that condition. The specific embodiment disclosed is thermocouple 1. The output of thermocouple 1 as a sensing device, ultimately positions an electric motor which not only maintains balance in the system but simultaneously exhibits its mechanical motion as reflecting the magnitude of the condition sensed.

The output of thermocouple 1 is compared with a constant electromotive force in potentiometric balancing network 2. Source 3 for the constant, reference, voltage has unique features per se as well as in combination with the other elements of the measuring system.

The resultant voltage, formed by the unbalance of network 2 is routed through standardizing switch mechanism 4 to a continuously actuated switch mechanism 5 and transformer 6. Continuously actuated switch 5 is referred to variously in the prior art as a mechanical inverter, a vibrator and a chopper. The term chopper will suffice to describe this device as essentially a continuously actuated pair of contacts which place the unbalance, output, D.-C. voltage of network 2 across the primary winding of transformer 6 in alternate directions in order to create fluxes which will link with the secondary winding to create an A.-C. voltage whose phase changes as the polarity of the output of network 2 changes and whose magnitude is proportional thereto.

Transformer 6 is a step-up transformer, performing an immediate amplification of the output of network 2. This stepped-up A.-C. voltage is amplified by two separate, electronic networks. As the first of these networks, pre-amplifier 7 has the plate currents of its 12AX7 electronic tube supplied from a source 8 of direct current and passes its output to the second, or main, electronic amplifier 9. After this final amplification, the A.-C. voltage is applied to circuit 10 to directionally control the rotation of motor 11 in its mechanical positioning of a balancing adjustable resistance in network 2 and simultaneously actuate a manifesting member as disclosed at 12.

Manifesting member 12 may be the recording and indicating pen moving over the surface of a chart, and cooperating with a scale. The self-balancing characteristic of the system is apparent in the balancing of network 2. Thus, for every value of the condition to which thermocouple 1 is subjected, the system causes motor 11 to position to bring about internal electric balance of the system and to externally position either an indicating and/or recording member 12 and/or a mechanism which controls the condition measured. The addition of control mechanism which could be actuated by motor 11 has not been disclosed as superfluous in the present disclosure.

The description will now break the measuring system into successively considered sections. The initial section will be the circuit immediately associated with thermocouple 1. The positive and negative leads of thermocouple 1 are designated 15 and 16. These leads may, in a broad view, be said to include network 2, standardizing switch 4, chopper 5 and the primary of transformer 6 in series. Attention is to be specifically directed, however, to the resistance-capacitor combination in the circuit of the leads between thermocouple 1, network 2 and standardizing switch 4. Two functions are performed by this combination.

The susceptibility of leads 15 and 16, in this type of measuring system, to stray A.-C. voltage pick-up is well known. Resistance 17 and capacitor 18 placed as disclosed here, have been found useful in attenuating any A.-C. voltage appearing across the thermocouple input terminals. A more graphic description of this action would picture the A.-C. voltages as circulated in the series circuit formed by thermocouple 1, resistance 17, capacitor 18 and leads 15 and 16. With the A.-C. voltage thus circulated, passage into the measuring circuit and ultimate imposition upon motor 11 is minimized. In the actual reduction to practice of this system, this circuit has been found effective against stray A.-C. voltage values up to 20 times the full range of the system.

The combination of resistance 19 and capacitor 18 is next considered. As a filter, this R-C combination prevents interaction between the thermocouple potential and that caused by electrostatic A.-C. flux linkages into the winding of the voltage supply of source 3. The function of this filter results in permissible operation of the entire system with its connections to the common supply in either of the two directions as well as with the thermocouple grounded. There is, of course, a limitation to the values of these resistances in that they must not drop the thermocouple voltage across them excessively. The order of their values, for an actual reduction to practice, was 200 ohms for resistor 17, 100 microfarads for capacitor 18 and 1,000 ohms for resistance 19.

Potentiometer balancing network 2 is of the conventional form found in measuring systems of this type. The resistances of the network are generally arranged as in a Wheatstone bridge, a unidirectional electromotive force of constant magnitude is applied to fixed conjugate points. The network resistances then form two parallel branches between the points. The variable electromotive force is applied to the bridge from a series circuit including the thermocouple 1 as a source of unidirectional electromotive force, the primary winding of transformer 6, chopper 5 and switch 4 at a fixed point in one network branch and through the movable contactor of a potentiometer in the other branch. The difference between the known and unknown electromotive forces appears alternately and oppositely across the halves of the primary of transformer 6. This difference is reduced to substantially zero when motor 11 is made to position contact 21 along resistance 20 in network 2.

The magnitude of the potentials compared in circuit 2 is quite small. In the actual reduction to practice, the reference voltage of source 3 is in the order of 1 volt and the input to the network from the thermocouple is in the order of millivolts. It is by reason of the fact that extremely small potentials are utilized in network 2 that the consistency and dependability of components, such as source 3, must be of a high order. Percentagewise, the output of source 3 is expected to vary less than ½ of 1% over long periods of time. Transient voltages from external sources independent of the condition are a constant menace to the sensitivity and accuracy of the measuring system. The filtering circuit of 17, 18, 19 form important protective features of the present system. Structural features of source 3 increase the stability and life of the system. The A.-C. ground through capacitor 22 adds to the protection by shunting transient A.-C. voltages to ground, from the measuring circuit, that may have escaped the filtering action of the filter circuit heretofore described.

Constant potential source 3 may now be considered as an entity. The common practice of many years was to utilize a battery, of some type, to supply a unidirectional electromotive force as a reference against which the thermocouple voltage would be compared in network 2. The comparatively short life of batteries necessitated use of a standard cell with which their output could be compared frequently. This process of standardization has long been a source of annoyance. Further, an operator always has had assurance of properly standardized performance for only short periods following the periodic check. The circuit disclosed at 3 eliminates the inconvenient arrangement of the prior art and provides a source of potential which is constant and dependable over relatively long periods of time.

Source 3 may be described as a two-cascade electronic reference source which will require standardization no more than once in six weeks. The characteristics of a type 6X4, a type OA2 and a type 5651 tube are utilized in the circuit. These tubes are connected in a circuit, with other components, to deliver an extremely stable, constant potential against which unknown potentials may be compared in network 2.

The type 6X4 full-wave rectifying tube 25 functions in a conventional manner with its two plates and cathode. Glow-discharge electronic type OA2 tube 26 is a voltage regulator which is non-linear in characteristic, holding the voltage drop across it constant within 1.5% during wide changes in current through it, and thus in line voltage. Tube 27 is a type 5651 glow-discharge tube which performs as a voltage reference, maintaining its stability of performance within extremely close limits. With tubes 26 and 27 connected in cascade, their characteristics cooperate to keep the largest variation of the output of the entire circuit within .15% over a line voltage variation of from 100 volts to 130 volts.

A number of actual embodiments of source 3 have been tested to arrive at the percentage of variation in the output. Among other tests applied to the actual reductions to practice was a change in ambient temperature from 40° F. to 140° F. Over this range of temperature variation there was only a maximum variation of .37% in the output of the source. Over long periods of time tests, sudden variations in output never exceeded .1% and the largest total variation was .34%. These and other tests clearly demonstrated that the overall function of the circuit of source 3 was quite satisfactory and a distinct improvement over prior sources.

Returning to the detailed description of the circuit of source 3, attention is directed to the center-tapped secondary winding of transformer 28. This secondary winding is well shielded in order to prevent electrostatic flux linkage from producing A.-C. induction in the circuit. The ends of this secondary are connected to the plates of rectifier tube 25 while the center-tap of the winding supplies the cathodes of tubes 26 and 27. The circuit, then, is, in actuality, formed between the leads of the cathode of tube 25 and the center tap of the secondary winding of transformer 28.

Capacitor 29 is the initial filtering element which smoothes the output of tube 25. A resistance 30 is connected in parallel with capacitor 29 for the specific purpose of forming a safety leak-off device which will prevent servicing personnel from receiving a shock from the charge remaining on capacitor 29 after transformer 28 has been disconnected from the line supply. Next, resistance 31 is arranged to fix the voltage and current across tube 26 in accordance with its rating and to provide proper firing voltage. The resistance 32 serves a similar purpose for tube 27. In an actual reduction to practice the voltage across tube 26 was held at 150 volts with 12 milliamperes flowing therethrough. The drop across tube 27 was held at 87 volts and 2.5 milliamperes.

The resistance-potentiometer combination 33, 34 completes the circuit components of source 3. With potentiometer 34 adjustable, a fine setting of the output of the unit was maintained in the order of 1 volt at 2 milliamperes in the actual reduction to practice. It is this output which is placed across potentiometer balancing network 2 for comparison with the thermocouple voltage.

Before proceeding, attention should be directed to the indication of a line supply to transformer 28. Similar designations are carried in association with chopper 5, preamplifier source 8 and motor drive circuit 10. It is for the convenience of illustration that these designations have been scattered through the disclosure of the system. In an actual reduction to practice, the transformers of source 3 and 8, along with that for amplifier-motor drive circuit 9, 10 were combined so that one primary winding was associated with the required number of secondary windings servicing the various components of the system.

Returning to a consideration of the function of source 3, it may be appreciated that despite its relatively great stability and dependability, there still may remain the desire for occasionally checking its output against a standard cell. A number of ways to standardize have been developed. The output of this electronic reference source 3 could be checked against a portable potentiometer, but this is inconvenient if a portable potentiometer is not available. Also, a known source of voltage could be applied to the thermocouple terminals and the movement of indicator 12 observed. This suggestion has a multiplicity of disadvantages.

The preferable method for standardizing this type of circuit is to disconnect the thermocouple circuit and compare the reference source directly with an external standard cell. Any unbalance will be observed by noting the motion of the pen. An adjustment of the potentiometer 34 will then correctly set, or standardize, the output of source 3.

A simple arrangement has been provided to accomplish the procedure of standardization by connecting a standard cell through a simple phone-jack type of switch carried between the thermocouple, transformer 6, chopper 5 and network 2. This phone-jack standardizing switch is depicted at 4 and the simplicity of connecting a standard cell 40 into the circuit, through plug 41 is clearly illustrated.

A practical embodiment of the standardizing phone-jack 4 is carried as item 245 in catalog 9 of the Western Electric Company. The internal arrangement of this switch is somewhat simplified in the present disclosure, but the principle of operation is precisely the same. The switch is shown in its normal operating position, that is, it is arranged to connect the positive side of thermocouple 1, by means of conductor 15, to the chopper 5 while the contactor 21 is connected to the center tap of the primary of transformer 6. With this arrangement, the unbalance of network 2, in its output conjugate, is taken to the chopper 5-transformer 6 combination for inversion into A.-C. voltage.

When plug 41 is inserted through guide ring 41A arms 42 and 43 are actuated. Actuation of these arms will cause contacts 44 and 45 to break and contacts 46 to make. Actuating arms 42 and 43 effectively engage the positive side of standard cell 40 with arm 43 and the negative side of the cell with arm 42. This actuation, then, will place source 3 in series with standard cell 40, chopper 5 and transformer 6. If there is any deviation between the output of source 3 and the standard cell 40 a resultant voltage will be placed upon the secondary of transformer 6 by chopper 5, subsequently amplified and motor 11 moved. Adjustment of potentiometer 34 will equalize the source and standard cell potentials and thus, "standardize" the system.

Returning to the assumption that the system is operating as disclosed, a change in the condition to which thermocouple 1 is responsive will cause a D.-C. potential to appear between the leads going to the center tap of transformer 6 and the switch arm of chopper 5. An energizing coil is indicated in chopper 5. There are other components of chopper 5 which could be depicted, such as the conventional polarizing permanent magnet. However, these mechanical, continuously operated switches are well developed in the art and need not be shown in detail here. It can be sufficiently appreciated from this disclosure that the unbalance potential is alternately and oppositely applied to the halves of the primary of transformer 6. The resulting potential induced in the secondary of transformer 6 is alternating in form. An A.-C. voltage can be readily amplified by the electronic networks 7 and 9 and applied to motor drive circuit 10 to control motor 11. To generalize, from this point on, through the system, a description will deal with an A.-C. voltage whose magnitude will follow the condition to which sensing device 1 is sensitive and whose phase will depend on which electromotive force predominates in the balanceable network 2, that of the sensing device, or, that of the constant voltage source 3.

As an electronic circuit, initially amplifying the A.-C. voltage output of transformer 6, pre-amplifier 7 offers a convenient point at which to perform several advantageous manipulations of the A.-C. voltage signal. First, of course, the voltage is amplified by the previously noted 12AX7 dual triode tube. Secondly, harmonics in the A.-C. input can be shunted to ground to prevent their subsequent amplification and application to the motor 11. Third, there is provided here an opportunity to shift the phase of the inverted A.-C. voltage in order to compensate for the inherent phase shift from the fundamental voltage by chopper 5. Fourth, there is provided an opportunity to insert a degenerative feed-back circuit which obtains gain stabilization. There is, also, the overall consideration of the advantage of limiting this pre-amplifier to two stages of amplication. With a separate source of constant unidirectional voltage for the plates of the 12AX7 tube, the danger of feed-back from a third stage of amplification into the filtering circuit of source 8 is eliminated.

Transformer 6, as an input device to pre-amplifier section 7, offers a point at which the impedance of the measuring circuit may be matched to that of the pre-amplifier section 7. The step-up function of transformer 6 is in the order of 1:12. This brings the impedance match between the measuring circuit and pre-amplifier 7 together on their ratio of 1:144. This matching leads directly into consideration of the function of capacitor 50 which is shunting the secondary of transformer 6. This capacitor 50 is sized so its combination with the secondary winding of transformer 6 will tune at the fundamental frequency of the A.-C. voltage induced into the secondary of transformer 6. In addition, capacitor 50 offers a comparatively low impedance path to ground for higher harmonics of the fundamental frequency, thus tending to attenuate those harmonics.

The general process of amplification by electronic triodes is assumed to be understood. With the A.-C. voltage on the grid of the first triode of the type 12AX7 tube, resistor 51 can next be observed in the cathode circuit of this triode, providing a correct value to produce the optimum operating level of this first triode. Thus capacitor 52 is placed in shunt across resistance 51 to provide a path for A.-C. voltage variations across resistor 51 which would introduce a degenerating feed-back into the amplified A.-C. voltage. The resulting, amplified voltage of the first triode of the type 12AX7 tube is developed across resistor 54.

Analyzing the circuit in view of the foregoing observations, a question may be raised as to why there is a single resistor 55 in the cathode circuit of the second triode of the type 12AX7 tube. This resistor 55 is given a value to set the operating level of the second triode. However, no by-pass capacitor was seen to be required, as sufficient gain is obtained without one.

The next combinations to be considered are resistor 54-capacitor 56 and capacitor 57-resistor 59. These R–C combinations, when properly valued, give a predetermined phase lead to the A.-C. voltage amplified by the circuit. This lead is made to compensate for the phase lag which is inherently introduced by chopper 5 as a mechanical switch. The lag introduced by this chopper 5 is caused by the physical delay between the energization of the electro-mechanical coil and resulting movement of its vibrated contactor. As is common in this form of electronic amplifiers, capacitors in the position of 56 and 57 are required for interstage coupling and coupling to the output of the last stage. With this fundamental requirement, the R–C combinations are introduced for manipulation of the phase of the voltage amplified. A common way of expressing the function of coupling capacitors 56 and 57 is to cite them for their function of preventing the power supply, D.-C. voltage, appearing on the grid of the succeeding tube. The result is that the grid voltage for the second section of the type 12AX7 tube is developed across resistor 54, and the output voltage of the entire amplifying section 7 is developed across resistor 59, free of D.-C. components.

With two stages of amplification available by use of the type 12AX7 double triode tube, the voltage across resistor 59 is dropped across a resistance 58 and applied across resistance 53 back in the cathode circuit of the first stage. The result is a gain stabilization of this amplifying section 7 by means of feed-back between the plate of the second stage and the grid of the first. This also cuts down the noise output of the entire amplifying section 7. Further, use of the feed-back resistor 58 results in a lower impedance between the grid of the next amplifying stage of main amplifier 9 and ground. Thus is provided a low impedance path for any pick-up voltages coming to the leads to the subsequent amplifying stage.

In the actual reduction to practice of this present system, there is a physical separation between amplifying section 7 and subsequent main amplifier 9. The necessary, connecting cable is susceptible to pick-up voltages. The low impedance circuit through resistor 58 helps to shunt these pick-up voltages to ground so that they will not be amplified and imposed upon the motor. Returning to the function of resistor 53 as a source of feed-back signal it is to be observed that the voltage drop across resistor 53 is opposite in direction and tends to reduce the stage voltage in proportion to the output of the entire amplifying section 7. The result is an A.-C. degenerative feed-back, tending to produce stability of amplifier gain.

The description now turns to source 8 which supplies direct current for the plates of the type 12AX7 tube. As commented upon earlier, the transformer secondary shown is wound on the common supply transformer to the entire system. This transformer secondary supplies the plates of a full-wave rectifier tube and the output of the cathode of this tube is filtered by a series of resistance capacitors. The advantage was previously mentioned of limiting a power supply to every two stages of amplification. Danger of having the third stage of amplification, in phase with the grid signal of the first stage, reflecting through the filtering network and onto the plate of the first stage, is thereby eliminated. Despite this problem, some designers of these circuits would form a single source of direct current with the plates of the amplifying tubes and use, for filtering purposes, electrolytic capacitors, with which it is possible to obtain capacitive values in the order of 20 to 40 microfarads, in small physical size. However, these electrolytic capacitors readily fail at high temperatures. As a matter of fact, these capacitors are notorious for being the first components to fail in many electronic systems. Therefore, oil-filled capacitors 60 and 61 are selected for their reliability. These oil-filled capacitors are relatively large in physical size, compared with the electrolytic capacitors. However, the resulting efficiency of filtering is satisfactory for two stages. The advantage of this arrangement in avoiding "motorboating," brought on by the fundamental frequency flowing through the filtering circuit back into the first stage, is sufficient justification for the present arrangement.

The description can now proceed rapidly through the function of the remaining components of the system. The arrangement heretofore described provides an amplified A.-C. voltage to the main amplifier 9 in the form which is substantially clean of spurious effects and is proportional to the output of thermocouple 1.

The main amplifier and motor drive circuit, as represented at 9 and 10, may take the form disclosed in Hornfeck 2,544,790. The amplifying section in that disclosure is a two-stage type using a dual triode tube. The motor drive circuit is a simple loop, including the motor control winding, a full-wave rectifier and an electronic tube in series. The Hornfeck patent adequately discloses and claims this arrangement and we need consider it here only in combination with the pre-amplifier section 7 and the other components of the measuring system.

With motor drive circuit 10 positioning motor 11, contactor 21 is moved along resistance 20 to balance network 2. As heretofore discussed, manifesting member 12 is an example of the devices which may be mechanically moved by motor 11, in addition to balancing contactor 21. This mechanical motion may be utilized to actuate any number of other devices for allied purposes.

What I claim as new and desire to secure by Letters Patent of the United States, is:

1. A self-balancing potentiometer system including, a thermocouple having a pair of leads for producing an E. M. F.; a balanceable network to which the E. M. F. is applied; a source of regulated constant E. M. F. for the network including, a center-tapped transformer secondary, a full-wave rectifier electronic tube with plates supplied by the secondary, resistance-capacitor elements connected with the rectifier output and center-tap to smooth the output, a voltage regulating glow-discharge tube across the rectifier output, and a voltage reference glow-discharge tube connected in cascade with the first glow-discharge tube across the rectifier; means for detecting the difference between the E. M. F.'s applied to the network including a transformer and periodically operated switch applying the difference to the transformer primary, a reversible electric motor responsive to the difference between the E. M. F.'s for operating the balanceable network to rebalance the potentiometer system, and an electronic amplifier between the detecting means and the motor for amplifying the difference and applying it to the control of the motor.

2. The potentiometer system of claim 1 wherein the source of regulated constant potential supply has its output controlled by an adjustable resistance and fixed resistance in series in its output to the balanceable network.

3. A self-balancing potentiometer system, including; a device responsive to a condition producing a unidirectional electromotive force in accordance with the magnitude of the condition; a source of unidirectional electromotive force of constant magnitude including, a center-tapped transformer secondary, a full-wave electronic rectifier supplied by the secondary, a first glow-discharge electronic tube between the cathode of the rectifier and the center tap of the transformer secondary arranged to give a constant voltage drop across its two connections, a second glow-discharge electronic tube in cascade with the first tube and arranged to function as a reference, and an adjustable resistance in the output of the source to the electric network; an electric network for opposing the first mentioned E. M. F. and that E. M. F. of constant magnitude to produce a differential unidirectional E. M. F. having a polarity dependent upon which of the opposed forces is greater; a slide-wire assembly arranged in the electric network to reduce the differential E. M. F. to substantially zero; a transformer having a secondary and a primary to which the differential is applied; a periodically operated switch for alternating and oppositely applying the differential E. M. F. to the primary to produce an alternating E. M. F. in the secondary whose phase depends upon the polarity of the differential E. M. F.; a first means amplifying the E. M. F. of the secondary; a first source of unidirectional E. M. F. for energizing the first amplifying means; a second means for amplifying the output of the first amplifying means; a second source of supply of unidirectional E. M. F. for the second amplifying means; and a phase sensitive motor controlled by the amplified E. M. F. for adjusting the slide-wire assembly to reduce the differential E. M. F. to substantially zero.

4. The potentiometer system of claim 3 in which the source of unidirectional E. M. F. of constant magnitude has the first glow-discharge electronic tube arranged to produce a constant voltage across its two connections over a predetermined range of a first portion of the current from the transformer and rectifier, and the second glow-discharge electronic tube is supplied the constant voltage output of the first glow-discharge electronic tube over a predetermined range of a second portion of the current from the transformer and rectifier.

5. The system of claim 3 in which a capacitor is arranged between the cathode of the rectifying tube and the transformer secondary center-tap, a resistance is arranged to shunt the capacitor, and a set of series resistances is arranged between the last glow-discharge tube and its connection to the network for opposing the first and second mentioned unidirectional E. M. F.'s one of the set of series resistances being manually adjustable in value.

References Cited in the file of this patent

UNITED STATES PATENTS

| | | |
|---|---|---|
| 2,493,772 | McCoy et al. | Jan. 10, 1950 |
| 2,529,490 | Field | Nov. 14, 1950 |
| 2,627,058 | Razek | Jan. 27, 1953 |
| 2,694,193 | Wannamaker et al. | Nov. 9, 1954 |
| 2,744,223 | English | May 1, 1956 |

OTHER REFERENCES

"Electronic Instruments," Greenwood, Holdam, Macrae, pp. 377, 378, McGraw Hill Book, 1948.